(12) United States Patent
McGrew et al.

(10) Patent No.: US 7,155,560 B2
(45) Date of Patent: Dec. 26, 2006

(54) METHOD AND APPARATUS FOR STORING DATA IN FLASH MEMORY

(75) Inventors: Richard A. McGrew, Folsom, CA (US); Richard P. Garner, Cameron Park, CA (US)

(73) Assignee: Intel Corporation, Santa Clara, CA (US)

( * ) Notice: Subject to any disclaimer, the term of this patent is extended or adjusted under 35 U.S.C. 154(b) by 433 days.

(21) Appl. No.: 09/892,816

(22) Filed: Jun. 27, 2001

(65) Prior Publication Data

US 2003/0003908 A1    Jan. 2, 2003

(51) Int. Cl.
*G06F 12/00* (2006.01)

(52) U.S. Cl. .............. 711/103; 711/100; 711/102; 711/103; 711/165; 713/1; 713/2; 713/100

(58) Field of Classification Search ........ 711/102–103, 711/111, 154, 159, 160, 165, 170–172, 173, 711/100; 717/171; 365/185; 707/205–206; 713/1–2, 100
See application file for complete search history.

(56) References Cited

U.S. PATENT DOCUMENTS

| | | | | |
|---|---|---|---|---|
| 5,412,798 A | * | 5/1995 | Garney | 719/321 |
| 5,535,369 A | * | 7/1996 | Wells et al. | 711/171 |
| 5,566,314 A | * | 10/1996 | DeMarco et al. | 711/103 |
| 5,579,502 A | * | 11/1996 | Konishi et al. | 711/103 |
| 5,590,306 A | * | 12/1996 | Watanabe et al. | 711/115 |
| 5,671,388 A | * | 9/1997 | Hasbun | 711/103 |
| 5,987,478 A | * | 11/1999 | See et al. | 707/205 |
| 6,038,636 A | * | 3/2000 | Brown et al. | 711/103 |
| 6,076,137 A | * | 6/2000 | Asnaashari | 711/103 |
| 6,189,070 B1 | * | 2/2001 | See et al. | 711/103 |
| 6,272,607 B1 | * | 8/2001 | Baentsch et al. | 711/162 |
| 6,412,040 B1 | * | 6/2002 | Hasbun et al. | 711/103 |
| 6,535,949 B1 | * | 3/2003 | Parker | 711/103 |
| 6,571,326 B1 | * | 5/2003 | Spiegel et al. | 711/170 |
| 6,584,495 B1 | * | 6/2003 | Bisset et al. | 709/217 |
| 6,640,334 B1 | * | 10/2003 | Rasmussen | 717/171 |
| 6,754,765 B1 | * | 6/2004 | Chang et al. | 711/103 |
| 6,791,877 B1 | * | 9/2004 | Miura et al. | 365/185.11 |

FOREIGN PATENT DOCUMENTS

| | | | | |
|---|---|---|---|---|
| EP | 0489204 | | * | 6/1992 |
| EP | 489204 | A1 | * | 6/1992 |
| EP | 0489204 | A1 | * | 10/1992 |
| JP | 2000305839 | | * | 11/2000 |

* cited by examiner

*Primary Examiner*—Matthew Kim
*Assistant Examiner*—Zhuo H. Li
(74) *Attorney, Agent, or Firm*—Blakely, Sokoloff, Taylor & Zafman LLP

(57) ABSTRACT

In an embodiment, a method includes receiving a request to download data into flash memory. The method also includes halting the downloading of the data into the flash memory until the flash memory is initialized. The initialization includes storing pointers in a memory to different locations within the flash memory where the data is to be stored. Additionally, the method includes storing the data into the flash memory based on the pointers stored in the memory.

26 Claims, 7 Drawing Sheets

METHOD AND APPARATUS FOR STORING DATA IN FLASH MEMORY

FIELD OF THE INVENTION

The invention relates to memory storage. More specifically, the invention relates to initializing flash memory and storing data therein.

BACKGROUND OF THE INVENTION

Flash memory is commonly used for applications that require a non-volatile memory to store code and data that must be retained when power to the memory is removed, but which can be re-written when necessary during operation. Flash memory is favored because it can be written and erased while in-circuit, and because it has read access times comparable to static random access memory (SRAM).

Current flash storage algorithms perform write operations as individual objects without regard for the size of the entire data being stored. Further, current storage algorithms typically scan the flash media before each write operation in order to find the location therein to put the data. This results in a significant time loss each time a write operation is called.

BRIEF DESCRIPTION OF THE DRAWINGS

Embodiments of the invention may be best understood by referring to the following description and accompanying drawings that illustrate such embodiments. The numbering scheme for the Figures included herein are such that the leading number for a given element in a Figure is associated with the number of the Figure. For example, device 128 can be located in FIG. 1. However, element numbers are the same for those elements that are the same across different Figures.

In the drawings.

DETAILED DESCRIPTION

In the following description, for purposes of explanation, numerous specific details are set forth in order to provide a thorough understanding of the present invention. It will be evident, however, to one skilled in the art that the present invention may be practiced without these specific details.

Figure 1:
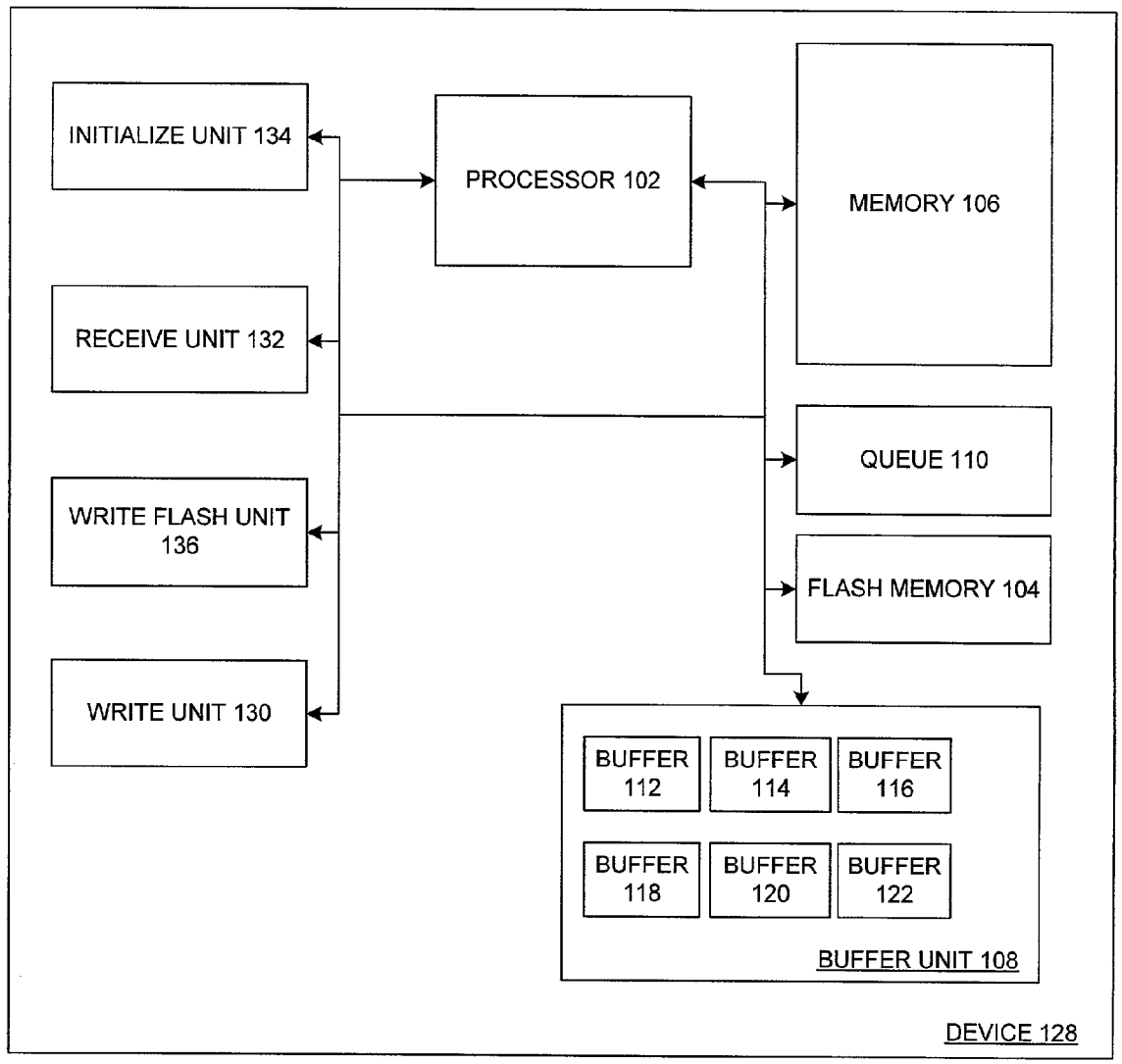
FIG. 1 illustrates portions of an apparatus for storing data into flash memory, according to embodiments of the present invention.

FIG. 1 illustrates portions of an apparatus for storing data into flash memory, according to embodiments of the present invention. In particular, FIG. 1 illustrates device 128, which includes processor 102, flash memory 104, memory 106, queue 110, buffer unit 108, initialize unit 134, receive unit 132, write flash unit 136 and write unit 130, which are all coupled together. In an embodiment, initialize unit 134, receive unit 132, write flash unit 136 and write unit 130 can be processes or tasks that can reside within memory 106 and/or processor 102 and can be executed within processor 102. However, embodiments of the present invention are not so limited, as initialize unit 134, receive unit 132, write flash unit 136 and write unit 130 can be different types of hardware (such as digital logic) executing the processing described therein.

In one embodiment, device 128 is a cellular telephone. However, embodiments of the present invention are not so limited, as device 128 may be any device that includes flash memory. For example, device 128 may be a one-way pager, a two-way pager, a global positioning system (GPS) device, a vehicle entertainment system, a portable entertainment device, a personal data assistant (PDA), or any other type of computing device. In one embodiment, flash memory 104 is a flash memory device. In an embodiment, queue 110 is a first-in-first-out register array (FIFO); however, embodiments of the present invention are not so limited, as queue 110 may be any kind of storage unit. For example, queue 110 may be a stack-based register array.

In one embodiment, buffer unit 108 contains a number of buffers, specifically, buffer 112, buffer 114, buffer 116, buffer 118, buffer 120, and buffer 122, which are buffers for the temporary storage of data to be input into flash memory 104. The number of buffers within buffer unit 108 is by way of example and not by way of limitation, as buffer unit 108 may contain a greater or lesser number of buffers. In one embodiment, memory 106 is random access memory (RAM).

In an embodiment, queue 110 is also random access memory (RAM). In an embodiment, queue 110 is configurable to be of different sizes. In one such embodiment, the size of queue 110 can range from 1024 to 4096 bytes. Queue 110 is shown to be external from memory 106. However, embodiments of the present invention are not so limited. For example, in another embodiment, queue 110 can be created and partitioned within memory 106.

Figure 2:
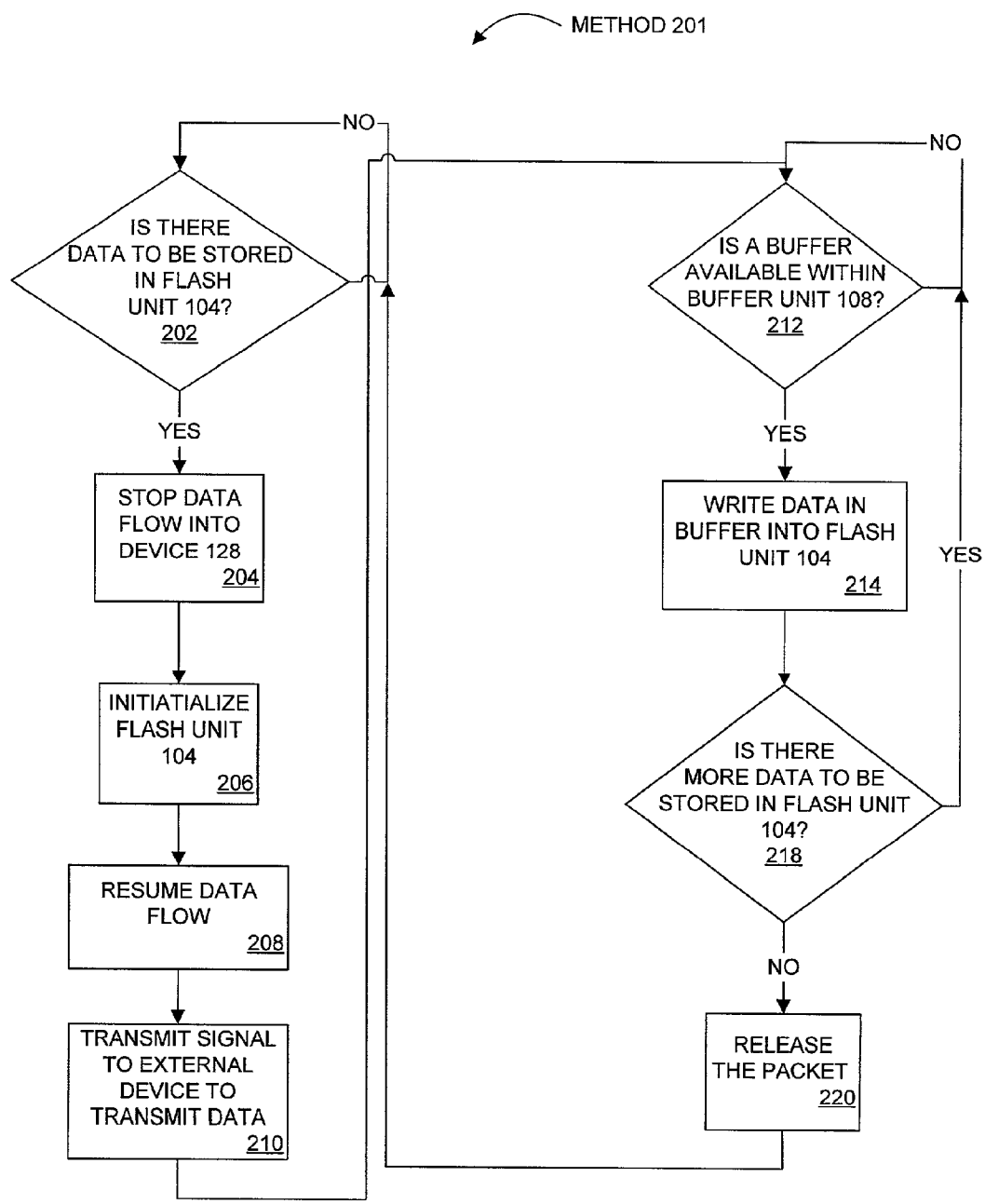
FIG. 2 illustrates a flow diagram of one embodiment for controlling writes to flash memory 104, according to embodiments of the present invention.

Certain operations of device 128 will now be described in conjunction with the flowcharts of FIGS. 2–5. FIG. 2 illustrates a flow diagram of one embodiment for controlling writes to flash memory 104, according to embodiments of the present invention. Method 201 of FIG. 2 commences with write unit 130 monitoring for the receipt of data to be stored in flash memory 104 from a device that is external to device 128 (hereinafter "the external device"), at process decision block 202. Upon determining that no data is to be received, write unit 130 continues monitoring for the receipt of data, at process decision block 202. In contrast, upon determining that there is data to be received, write unit 130 stops any current data flow into device 128, at process block 204. In an embodiment, this stoppage of data flow into device 128 includes the halting of operations by method 401, which provides for the downloading of data into device 128 and is describe in more detail below in conjunction with FIG. 4.

Figure 3:
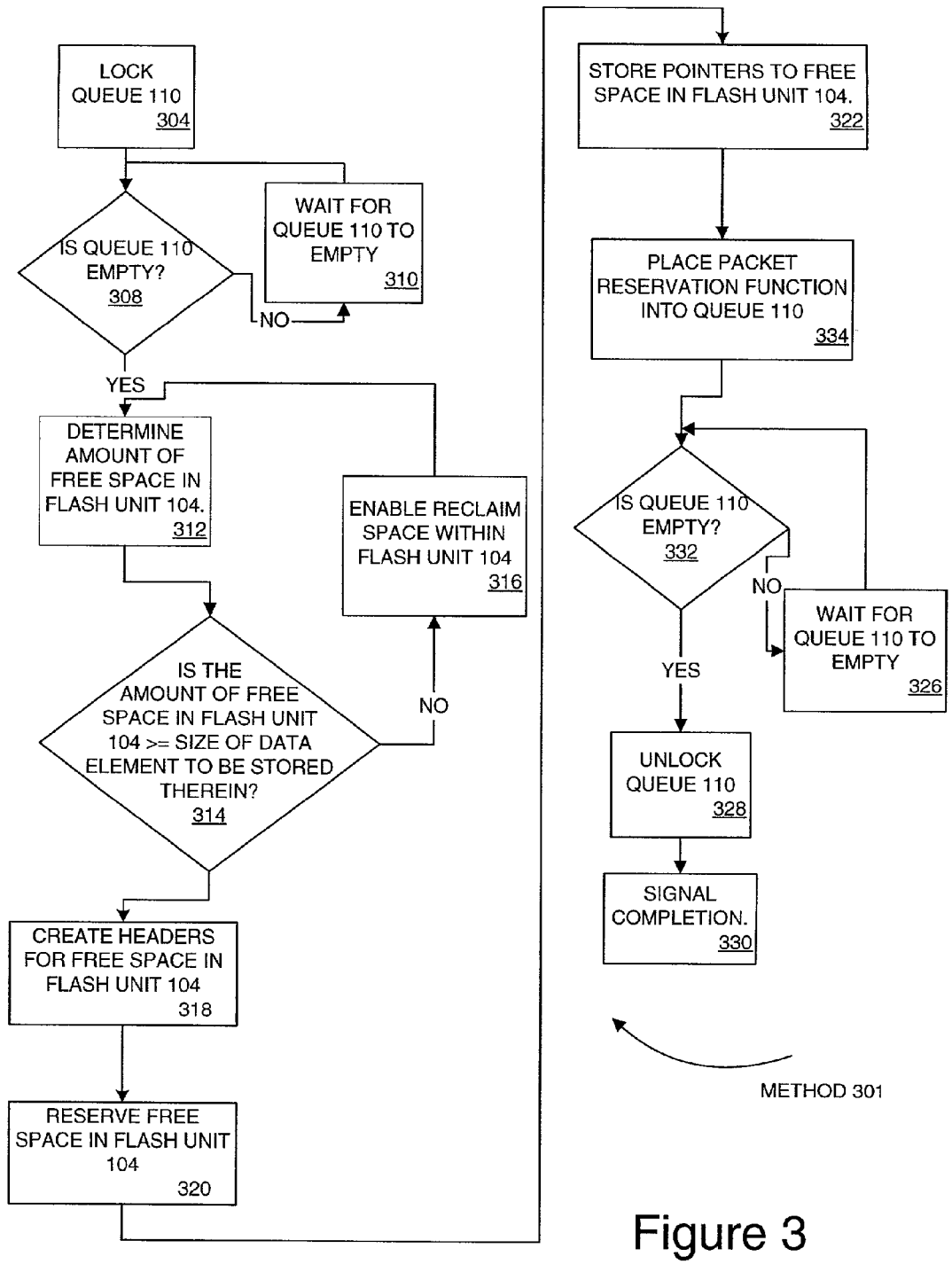
FIG. 3 illustrates a flow diagram for initializing flash memory 104, according to embodiments of the present invention.

Additionally, write unit 130 initializes flash memory 104 prior to receiving the data into device 128, at process block 206. FIG. 3 illustrates a flow diagram for initializing flash memory 104, according to embodiments of the present invention. Method 301 of FIG. 3 commences with initialize unit 134 locking queue 110, at process block 304. Accordingly, this locking of queue 110 precludes other units from inserting data or other tasks into queue 110 during the initialization of flash memory 104.

Initialize unit 134 determines whether queue 110 is empty, at process decision block 308. Upon determining that queue 110 is not empty, initialize unit 134 waits a predetermined amount of time, at process block 310, and again determines whether queue 110 is empty at process decision block 308. However, embodiments of the present invention are not so limited, as initialize unit 134 can continue to check if queue 110 is empty, independent of a timer or predetermined amount of time. Conversely, upon determining that queue 110 is empty, initialize unit 134 determines the amount of free space in flash memory 104, at process block 312. In one embodiment, flash memory 104 includes a number of blocks for storage of data. In an embodiment, the size of the blocks within flash memory 104 is 64 kilobytes.

In an embodiment, an array in memory 106 stores two values for each block within flash memory 104. The first value indicates the number of bytes that are free, meaning that no data is stored therein, and can be written to. The second value indicates the number of bytes that are "dirty", which are those bytes that include data but can be overwritten, and thus written to. Examples of "dirty" bytes could include data that expires after a predefined time period or is no longer used by units in device 128, but remains therein because the data has not been overwritten. Accordingly, initialize unit 134 can traverse this array in memory 106 to determine the amount of free space within flash memory 104.

Initialize unit 134 determines whether the amount of free space in flash memory 104 is greater than or equal to the size of the data to be received into device 128 from the external device, at process decision block 314. In particular, the value for this size of the data is transmitted into device 128 from the external device when the external device transmits the request to download data into device 128. Upon determining that the amount of free space in flash memory 104 is not greater than or equal to the size of the data and associated overhead to be received into device 128, initialize unit 134 reclaims space within flash memory 104 that is reclaimable (i.e., dirty), at process block 316. In embodiments wherein the array within memory 106 indicates the amount of space within blocks of flash memory 104 are "dirty", initialize unit 134 erases these "dirty" bytes within flash memory 104. Additionally, initialize unit 134 again determines the amount of free space within flash memory 104, at process block 312. Initialize unit 134 continues checking for free space and reclaiming that space that can be reclaimed in flash memory 104. In one embodiment, a timer can be set such that upon expiration of this timer if there is not enough free space available, initialize unit 134 returns an error and does not allow for the write of this data into flash memory 104.

Upon determining that the amount of free space in flash memory 104 is greater than or equal to the size of the data to be received into device 128, initialize unit 134 creates headers for the different locations of free space in flash memory 104 and stores these headers into flash memory 104, at process block 318. In particular, the data stored in flash memory 104 also includes a header with information related to the data. For example, these headers could include the length of the data for this header in a given block or partition within flash memory 104.

The data to be stored in flash memory 104 may be larger than a given amount of contiguous free space in memory. Accordingly, the data to be stored in flash memory 104 can be stored across a number of different locations in flash memory 104. In an embodiment, these headers are stored in-line with the data to be stored in the free space. For example, in an embodiment, the header for data in a block of flash memory 104 can be stored prior to the location of the actual data. In one embodiment, these headers include different information about the data being stored in flash memory 104, such as the length of the data for this header.

Additionally, initialize unit 134 reserves the free space in flash memory 104 that is to be used for writing the data to be received into device 128 to ensure that no other units within device 128 write to or delete the bytes within this free space. Initialize unit 134 also stores pointers, within memory 106, to the different locations in flash memory 104 for this reserved free space. As described above, because the data to be stored in flash memory 104 can be greater than any one contiguous free space within flash memory 104, a number of different pointers stored in memory 106 may be needed to point to the multiple locations of free space within flash memory 104 for storage of this data.

This creation and reservation of free space within flash memory 104 as well as the creation of the headers and pointer associated therewith are considered a data reservation function. Accordingly, in an embodiment, initialize unit 134 also places this data reservation function into queue 110, at process block 334. This data reservation function will be removed from queue 110 upon completion of this creation and reservation of free space within flash memory 104 as well as the creation of the headers and pointer associated therewith.

Therefore, initialize unit 134 determines whether queue 110 is empty, at process decision block 332. In particular, because queue 110 was emptied prior to proceeding to process block 312, queue 110 only includes this data reservation function. Therefore, when queue 110 is empty, this data reservation function is considered complete. Accordingly, upon determining that queue 110 is not empty, initialize unit 134 waits for queue 110 to empty, at process block 326. In one such embodiment, this wait time can be based on a preset timer such that initialize unit 134 can again check to see if queue 110 is empty, at process decision block 332, upon expiration of a timer. However, embodiments of the present invention are not so limited, as initialize unit 134 can continue to check if queue 110 is empty, independent of a timer.

Upon determining that queue 110 is empty, initialize unit 134 unlocks queue 110, at process block 328. Additionally, initialize unit 134 signals completion of initializing flash memory 104, at process block 330. In an embodiment, this completion signal is through a semaphore that can be read by other units within device 128 interested in this semaphore.

Returning to FIG. 2, after flash memory 104 has been initialized and the completion signal has been transmitted by initialize unit 134, write unit 130 receives this completion signal. In an embodiment wherein the completion signal is a setting of a semaphore, write unit 130 receives this completion signal by checking the semaphore. Write unit 130 resumes data flow into device 128, at process block 208.

Figure 4:
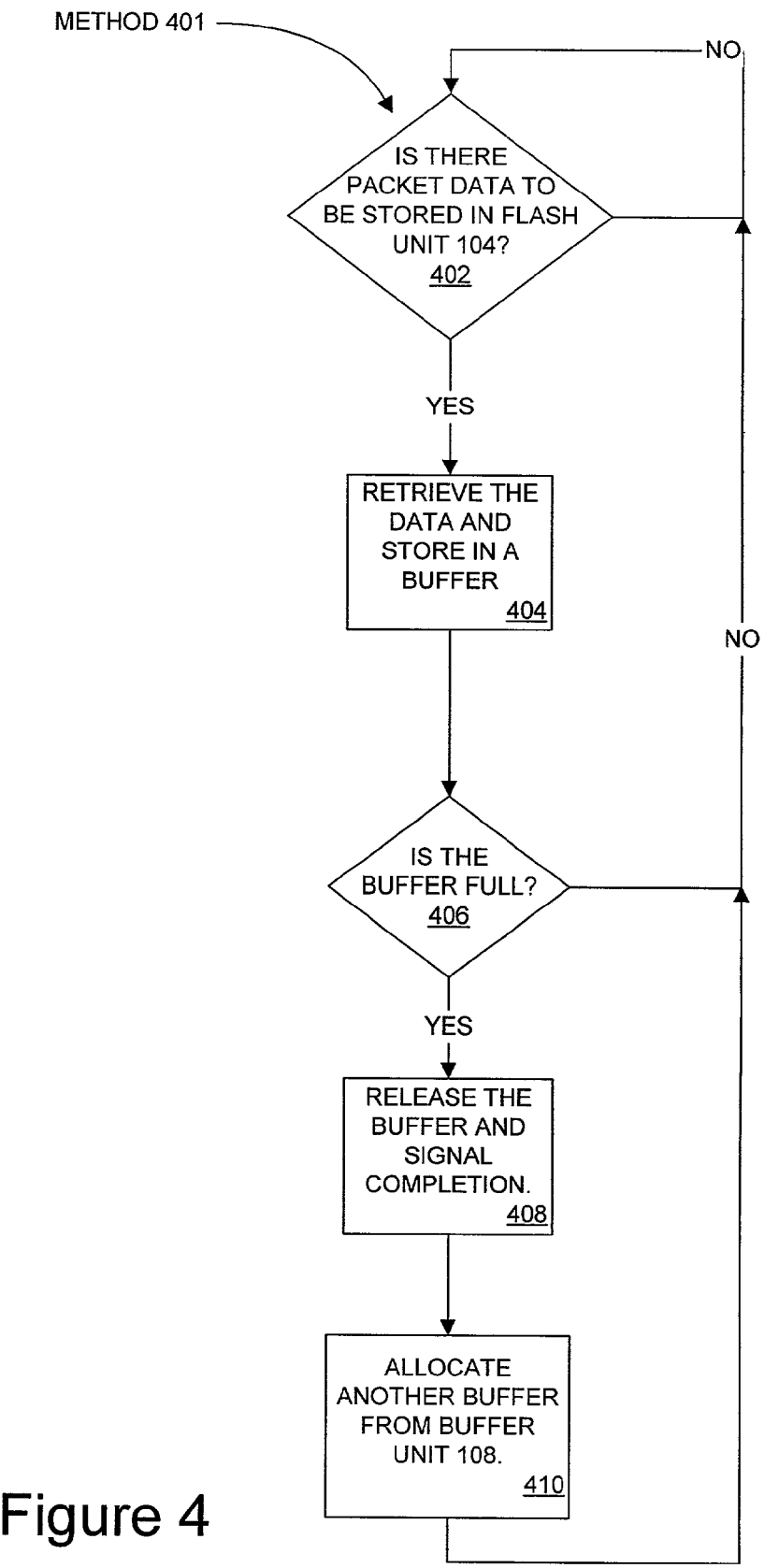
FIG. 4 illustrates a flow diagram of one embodiment for receiving and storing of this data flow into device 128, according to embodiments of the present invention.

FIG. 4 illustrates a flow diagram of one embodiment for receiving and storing of this data flow into device 128, according to embodiments of the present invention. In particular, FIG. 4 illustrates a flow diagram for the temporary storage of data intended for flash memory 104 into one of buffers 112–122 of buffer unit 108, according to embodiments of the present invention. Further, in an embodiment, the operations illustrated by method 401 of FIG. 4 are performed by receive unit 132. In one such embodiment, receive unit 132 is an interrupt service routine executing within processor 102.

Method 401 of FIG. 4 commences with the determination of whether there exists data to be transmitted to device 128 by receive unit 132, at decision block 402. In an embodiment wherein device 128 is a wireless device, the data could be received from a network. In one such embodiment, the BLUETOOTH™ standard is employed for this data transmission.

Upon determining that there is no data to be received, receive unit 132 continues to check for such data. In contrast, upon determining that there is data to be received, receive unit 132 receives the data and stores the data into one of buffers 112–122 within buffer unit 108, at process block 404. In an embodiment, the size of the buffers are configurable by receive unit 132. In one such embodiment, the size of the buffers is 512 bytes.

Receive unit 132 also determines whether the buffer in which the data is being stored is full, at process decision block 406. Upon determining that the buffer is not full, receive unit 132 continues checking for more data to be received, at process decision block 402. Conversely, upon determining that the buffer is full, receive unit 132 releases the buffer and signals completion of writing to the buffer, at process block 408. In an embodiment, this completion signal is through a semaphore that can be read by other units within device 128 interested in this semaphore. Additionally, receive unit 132 allocates another buffer within buffer unit 108, at process block 410, and continues to receive more data to place into this allocated buffer, at process block 402. This process illustrated by method 401 continues until external devices do not have data to download into flash memory 104 of device 128 or until other units within device 128 stop the data flow, such as write unit 130.

Returning to FIG. 2, after resuming data flow into device 128, write unit 130 transmits a signal to the external device, which is requesting to download data into device 128, indicating to this external device that it can commence transmission of data to device 128, at process block 210. Additionally, write unit 130 determines whether a buffer within buffer unit 108 is available with data that has been transmitted from the external device, at process decision block 212. In an embodiment, this determination is based on a semaphore that is set by receive unit 132. In particular as described above in conjunction with FIG. 4, receive unit 132 receives the data being transmitted into device 128 from the external device, places this data into buffers with buffer unit 108 and transmits a completion signal, such as the setting of a semaphore, when a buffer has been filled with data. Upon determining that a buffer within buffer unit 108 is not available with data, write unit 130 continues checking for a buffer within buffer unit 108 that is available with data, at process block 212. Conversely, upon determining that a buffer within buffer unit 108 is available with data, write unit 130 begins writing the data within the buffer in buffer unit 108, at process block 214.

Figure 5:
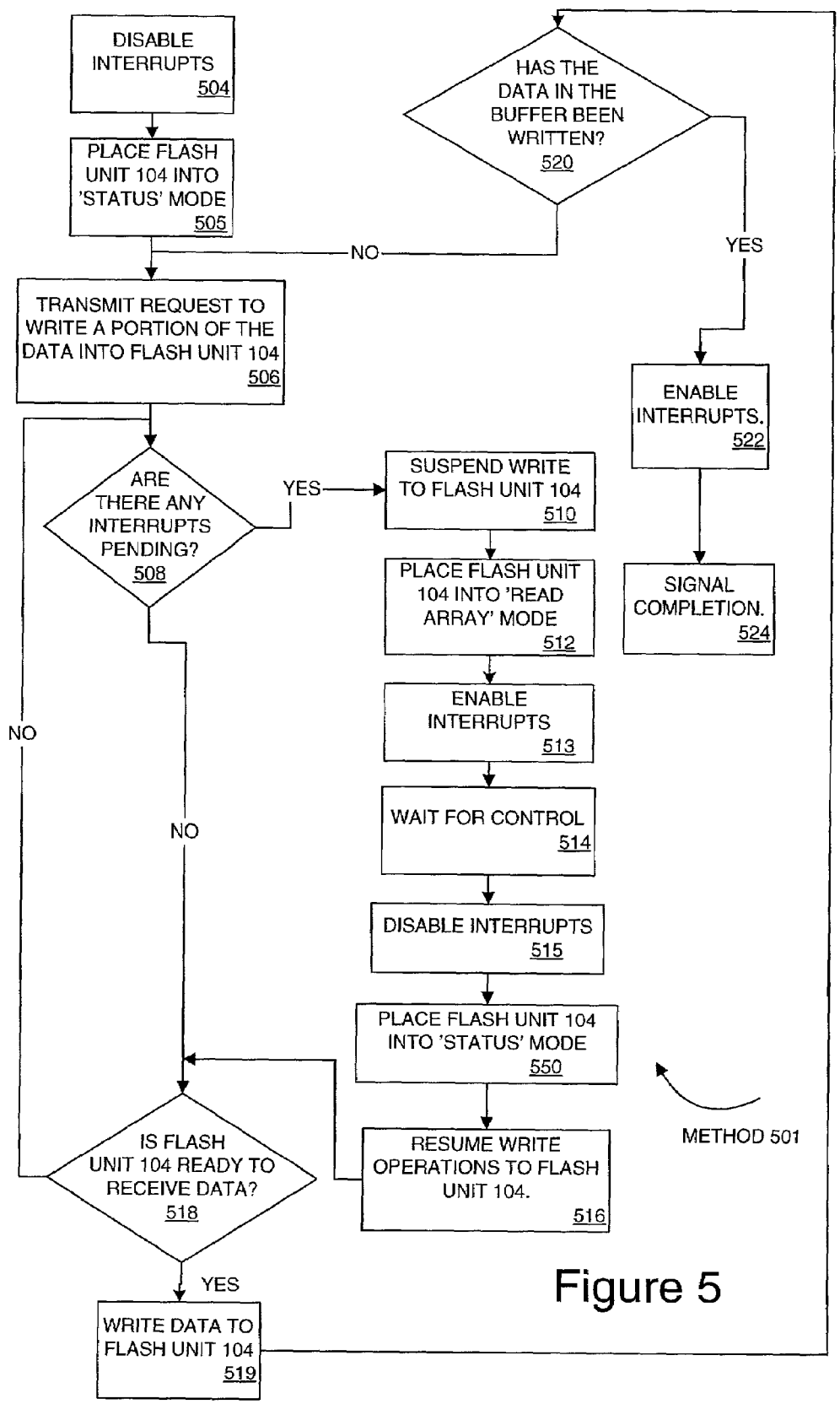
FIG. 5 illustrates a flow diagram for writing data into flash memory 104, according to embodiments of the present invention.

In particular, FIG. 5 illustrates a flow diagram for writing data into flash memory 104, according to embodiments of the present invention. FIG. 5 commences with the disabling of interrupts within device 128 by write flash unit 136, at process block 504. Examples of the types of interrupts when device 128 is a cellular telephone includes button presses on the keypad for dialing a telephone number and data being received from external devices. This disablement of interrupts allows for the writing of data into flash memory 104 more quickly, as processor 102 does not interrupt write flash unit 136 to process interrupts by other units and/or tasks within device 128. Additionally, this disablement of interrupts is needed when writing data into flash as two commands for writing to flash are required to be contiguous. In particular, a first command that places the flash in a mode to receive data (i.e., status mode) is to be followed by a second command for the data to be written, as the flash must be in a given mode to write data therein.

Write flash unit 136 also place flash memory 104 into 'status' mode. In an embodiment, when in 'status' mode, the bytes within flash memory 104, when read, indicate status regarding the current operation occurring thereto. In an embodiment, the 'status' mode can return information regarding the status of a given block or other partition of flash memory 104. Accordingly, when reading bytes in a given block, these bytes return the status for the entire block. Examples of the type of status information returned includes, but is not limited to, whether the current operation occurring within the partition or block is complete, whether any errors have occurred during this current operation, as well as the type of errors (if any errors did occur). An example of the type of error that could occur during a write or erase operation includes attempting to write to a block of data that is locked.

Additionally, write flash unit 136 determines the location to write data into flash memory 104 based on the pointers, stored in memory 106, that point to the reserved free space in flash memory 104 where the data is to be written. Write flash unit 136 transmits a request to write a portion of the data from the buffer within buffer unit 108 to at least one of these locations within flash memory 104, at process block 506. In an embodiment, this portion of data to be written is a 16-bit word. In another embodiment, this portion of data to be written is a 32-bit word. Write flash unit 136 determines whether there are any interrupts pending in device 128, at process decision block 508. Upon determining there are no interrupts pending in device 128, write flash unit 136 determines whether flash memory 104 is ready to write data, at process decision block 518. In particular, when a request is made to write data to flash memory, there can be a delay in order to ramp up power supplies, condition the location to where the data is being written and ramp down these power supplies all internal to the flash memory.

Upon determining there are interrupts pending in device 128, write flash unit 136 suspends these write operations to flash memory 104. Additionally, write flash unit 136 places flash memory 104 into a "read array" mode, which allows for the reading of data from flash memory 104. Write flash unit 136 also enables interrupts in device 128 that were disabled in process block 504, at process block 513. Accordingly, the operating system (not shown) being executed by processor 102 will handle the interrupts and while using a prioritization scheme for the different units executing within device 128, the operating system will return control to write flash unit 136 when the unit becomes the highest priority to be processed by processor 102. Write flash unit 136, therefore, waits for the return of control, at process block 514. Once control is returned, write flash unit 136 disables interrupts within device 128, at process block 515, and places flash memory 104 back into 'status' mode, at process block 550, similar to process blocks 504–505 described above. Write flash unit 136 resumes write operations to flash memory 104, at process block 516. Write flash unit 136 determines whether flash memory 104 is ready to write data, at process decision block 518, as described above.

Upon determining that flash memory 104 is not ready to write data, write flash unit 136 continues checking to determine whether there are any interrupts pending, at process decision block 508. In contrast, upon determining that flash memory 104 is ready to write data, write flash unit 136 writes this portion of data into flash memory 104, at process block 519. Additionally, write flash unit 136 determines whether the data from the buffer within buffer unit 108 has been written to flash memory 104, at process decision block 520. Upon determining that all of the data from the buffer within buffer unit 108 has not been written into flash memory 104, write flash unit 136 transmits another request to flash memory 104 to write data therein, at process block 506, as described above. Conversely, upon determining that all of the data from the buffer within buffer unit 108 has been written into flash memory 104, write flash unit 136 re-enables interrupts that were disabled in process block 504, at process block 522. Write flash unit 136 signals completion of writing data into flash memory 104, at process block 524. In an embodiment, this completion signal is through a semaphore that can be read by other units within device 128 interested in this semaphore.

As illustrated, write flash unit 136 writes data stored in buffers 112–122 of buffer unit 108 into flash memory 104, while still allowing for interrupts at certain times during the write operation. Returning to the examples of the types of interrupts when device 128 is a cellular telephone, certain interrupts within device 128 can be of such a high priority that they are required to be processed or the device 128 will no longer be functional. For example, if a user of the cellular telephone is attempting to entering a telephone number and place the call and if the data being written to flash memory 104 is large, the delay time for processing these button presses by the user could be large.

Figure 6:
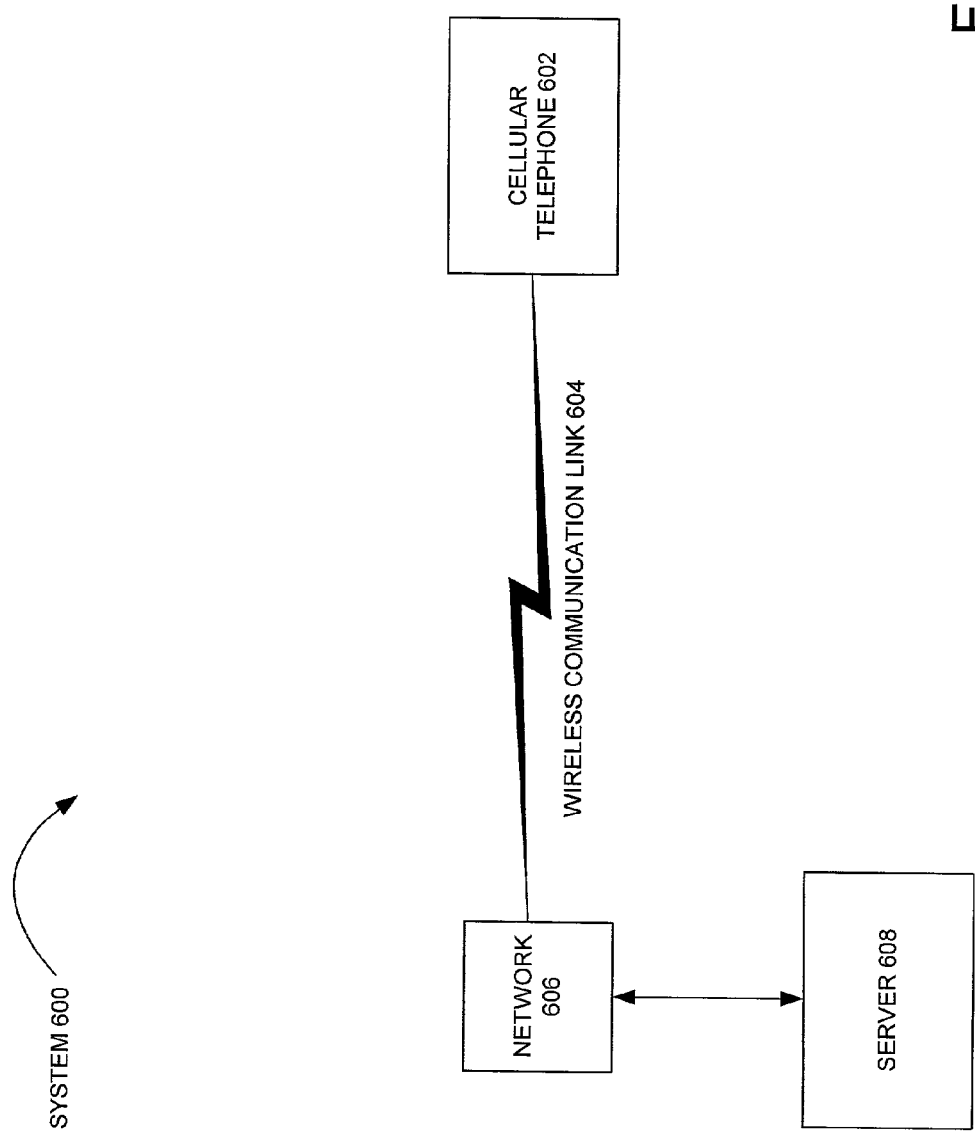
FIG. 6 illustrates a system that can incorporate embodiments of the present invention.

FIG. 6 illustrates a system that can incorporate embodiments of the present invention. In particular, FIG. 6 illustrates system 600 that includes cellular telephone 602 which is wireless coupled to network 606 through wireless communication link 604. Additionally, network 606 is coupled to server 608. Cellular telephone 602 is an embodiment of device 128, illustrated in FIG. 1 above, while server 608 is an embodiment of the external device that is downloading data into the flash memory of cellular telephone 602.

In one embodiment, network 606 is a local area network (LAN). In another embodiment, network 606 is a wide area network (WAN). In an embodiment, network 606 is the Internet. Further, network 606 can be a combination of different networks that provide communication between server 608 and cellular telephone 602. Examples of the different types of data to be downloaded by server 608 into cellular telephone 602 could be web pages and applets from different web sites residing in server 608.

Figure 7:
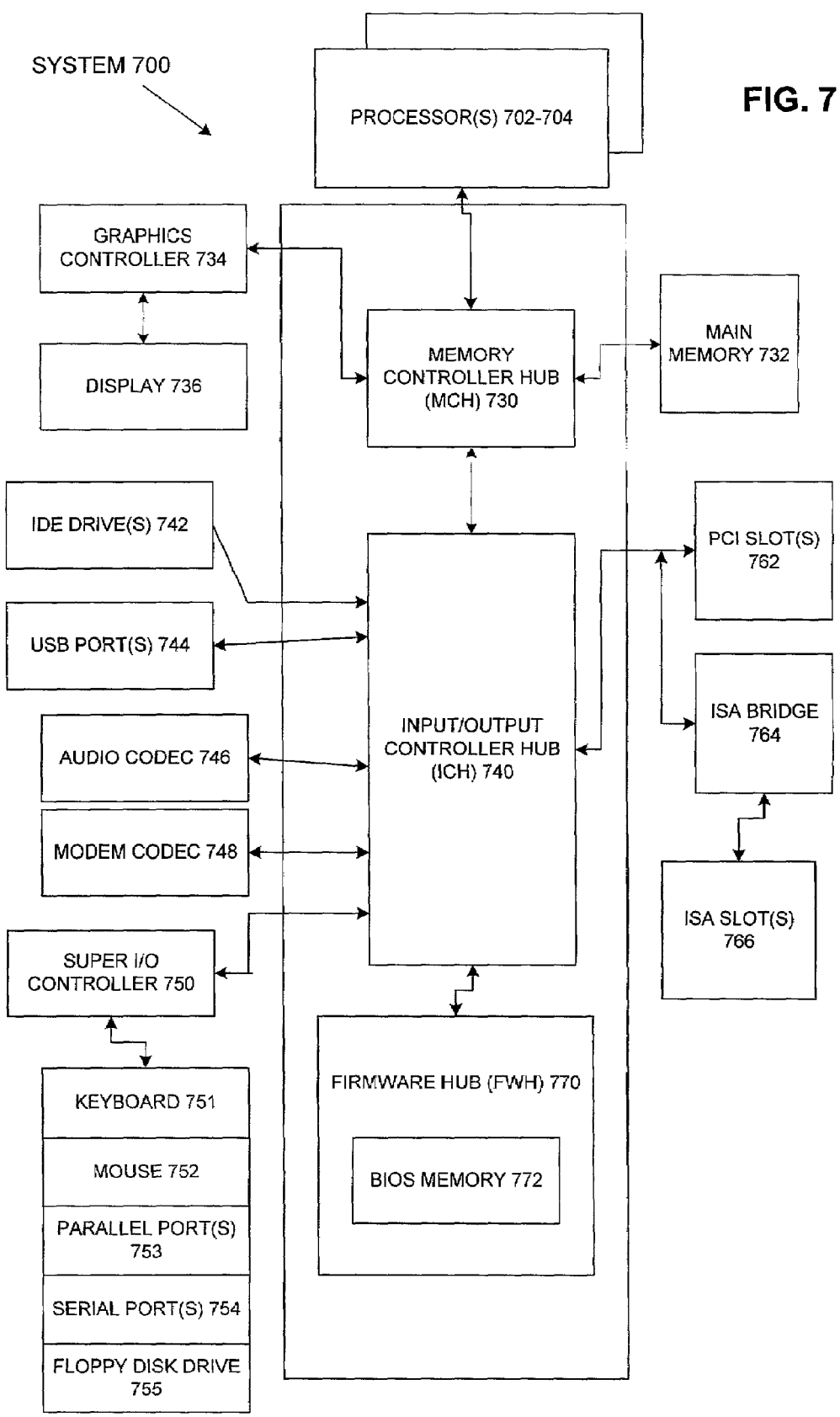
FIG. 7 illustrates an exemplary computer system comprising a processor having an instruction pipeline with hardware predication for initializing a flash memory device and storing data therein, according to embodiments of the present invention.

FIG. 7 illustrates an exemplary system 700 comprising processors 702 and 704 (similar to processor 102 of FIG. 1 above) for initializing a flash memory device and storing data therein, according to embodiments of the present invention. Although described in the context of system 700, the present invention may be implemented in any suitable computer system comprising any suitable one or more integrated circuits.

As illustrated in FIG. 7, computer system 700 comprises processor 702 that may include instructions for message accumulation and retrieval, as described herein. Computer system also can include another processor 704 that may also have instructions for message accumulation and retrieval, as described herein. Computer system 700 also includes processor bus 710, and chipset 720. Processors 702 and 704 and chipset 720 are coupled to processor bus 710. Processors 702 and 704 may each comprise any suitable processor architecture and for one embodiment comprise an Intel® Architecture used, for example, in the Pentium® family of processors available from Intel® Corporation of Santa Clara, Calif. Computer system 700 for other embodiments may comprise one, three, or more processors any of which may execute a set of instructions that are in accordance with embodiments of the present invention.

Chipset 720 for one embodiment comprises memory controller hub (MCH) 730, input/output (I/O) controller hub (ICH) 740, and firmware hub (FWH) 770. MCH 730, ICH 740, and FWH 770 may each comprise any suitable circuitry and for one embodiment is each formed as a separate integrated circuit chip. Chipset 720 for other embodiments may comprise any suitable one or more integrated circuit devices.

MCH 730 may comprise any suitable interface controllers to provide for any suitable communication link to processor bus 710 and/or to any suitable device or component in communication with MCH 730. MCH 730 for one embodiment provides suitable arbitration, buffering, and coherency management for each interface.

MCH 730 is coupled to processor bus 710 and provides an interface to processors 702 and 704 over processor bus 710. Processor 702 and/or processor 704 may alternatively be combined with MCH 730 to form a single chip. MCH 730 for one embodiment also provides an interface to a main memory 732 and a graphics controller 734 each coupled to MCH 730. Main memory 732 stores data and/or instructions, for example, for computer system 700 and may comprise any suitable memory, such as a dynamic random access memory (DRAM) for example. Graphics controller 734 controls the display of information on a suitable display 736, such as a cathode ray tube (CRT) or liquid crystal display (LCD) for example, coupled to graphics controller 734. MCH 730 for one embodiment interfaces with graphics controller 734 through an accelerated graphics port (AGP). Graphics controller 734 for one embodiment may alternatively be combined with MCH 730 to form a single chip.

MCH 730 is also coupled to ICH 740 to provide access to ICH 740 through a hub interface. ICH 740 provides an interface to 110 devices or peripheral components for computer system 700. ICH 740 may comprise any suitable interface controllers to provide for any suitable communication link to MCH 730 and/or to any suitable device or component in communication with ICH 740. ICH 740 for one embodiment provides suitable arbitration and buffering for each interface.

For one embodiment, ICH 740 provides an interface to one or more suitable integrated drive electronics (IDE) drives 742, such as a hard disk drive (HDD) or compact disc read only memory (CD ROM) drive for example, to store data and/or instructions for example, one or more suitable universal serial bus (USB) devices through one or more USB ports 744, an audio coder/decoder (codec) 746, and a modem codec 748. ICH 740 for one embodiment also provides an interface through a super I/O controller 750 to a keyboard 751, a mouse 752, one or more suitable devices, such as a printer for example, through one or more parallel ports 753, one or more suitable devices through one or more serial ports 754, and a floppy disk drive 755. ICH 740 for one embodiment further provides an interface to one or more suitable peripheral component interconnect (PCI) devices coupled to ICH 740 through one or more PCI slots 762 on a PCI bus and an interface to one or more suitable industry standard architecture (ISA) devices coupled to ICH 740 by the PCI bus through an ISA bridge 764. ISA bridge 764 interfaces with one or more ISA devices through one or more ISA slots 766 on an ISA bus.

ICH 740 is also coupled to FWH 770 to provide an interface to FWH 770. FWH 770 may comprise any suitable interface controller to provide for any suitable communication link to ICH 740. FWH 770 for one embodiment may share at least a portion of the interface between ICH 740 and super 110 controller 750. FWH 770 comprises a basic input/output system (BIOS) memory 772 to store suitable system and/or video BIOS software. BIOS memory 772 may comprise any suitable non-volatile memory, such as a flash memory for example.

Accordingly, computer system 700 includes a machine-readable medium on which is stored a set of instructions (i.e., software) embodying any one, or all, of the methodologies described above. For example, software can reside, completely or at least partially, within main memory 732 and/or within processors 702/704. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical. A communication medium includes other form of propagated signals (e.g., carrier waves, infrared signals, digital signals, etc.); etc.

Thus, a method and apparatus for initializing a flash memory for the storage of data therein have been described. Although the present invention has been described with reference to specific exemplary embodiments, it will be evident that various modifications and changes may be made to these embodiments without departing from the broader spirit and scope of the invention. For example, data may be stored into Flash memory 104 in sizes other than 16-bits at a time. Accordingly, the specification and drawings are to be regarded in an illustrative rather than a restrictive sense.

What is claimed is:

1. A method comprising:
   receiving a request to download data into flash memory;
   halting the downloading of the data into the flash memory until the flash memory is initialized, wherein the initialization includes reclaiming space in the flash memory to accommodate the request, reserving the space in the flash memory to ensure the space is not used in a manner not associated with the request, and storing pointers in a second memory to indicate different locations within the flash memory where the data is to be stored within the flash memory; and
   storing the data into the flash memory based on the pointers stored in the second memory.

2. The method of claim 1, wherein the initialization of the flash memory comprises:
   generating headers for the different locations within the flash memory where the data is to be stored; and
   storing the headers at the different locations within the flash memory.

3. The method of claim 1, further comprising storing the data received from the download into a number of buffers prior to storing the data into the flash memory.

4. The method of claim 1, wherein the initialization of the flash memory comprises reclaiming space within the flash memory that is reclaimable for storage of data into the flash memory.

5. A method comprising:
   receiving a request from an external device to store data into a flash memory of a device, wherein the request includes the size of the data;
   in response to receiving the request, initializing the flash memory of the device prior to receiving the data, wherein the initializing comprises:
     determining whether the size of free space within the flash memory is greater than the size of the data;
     upon determining that the size of the free space within the flash memory is not greater than the size of the data, reclaiming space in the flash memory to accommodate the request;
     reserving the space in the flash memory to ensure the space is not used in a manner not associated with the request; and
     storing pointers, in a separate memory, to indicate a number of different locations within the flash memory where the free space is located.

6. The method of claim 5, further comprising:
   generating headers for each of the number of different locations within the flash memory where the free space is located;
   storing the headers into the number of different locations within the flash memory;
   transmitting a signal to the external device to transmit the data after the initialization of the flash memory is completed;
   receiving the data into a number of buffers within the device; and
   storing the data within the number of buffers into the number of different locations within the flash memory where the free space is located.

7. The method of claim 6, wherein the device is a cellular telephone and the external device is a server coupled to a network and wherein the data is transmitted to the cellular telephone through a wireless transmission link.

8. The method of claim 6, further comprising disabling interrupts within the device when portions of the data are being written into the number of different locations in the flash memory.

9. The method of claim 8, further comprising:
   determining whether interrupts are pending in the device periodically during the time the data is being written into the number of different locations in the flash memory; and
   periodically halting the writing of the data into the number of different locations in the flash memory and servicing the interrupts that are pending in the device upon determining that interrupts are pending.

10. An apparatus comprising:
    a flash memory partitioned into blocks;
    a random access memory coupled to the flash memory;
    a write unit coupled to the flash memory and the random access memory, wherein the write unit is to receive a first request to download data into the flash memory and wherein the write unit is to download the data into the flash memory; and
    an initialize unit coupled to the flash memory, the random access memory and the write unit to initialize the flash memory in response to receiving the request to download data by reclaiming space in the flash memory to accommodate the request, reserving the space in the flash memory to ensure the space is not used to comply with a second request received by the write unit until the first request is completed, and storing pointers, prior to downloading the data into the flash memory, in the random access memory to indicate the number of the blocks within the flash memory that are free to store the data.

11. The apparatus of claim 10, wherein the initialize unit is to store headers at the number of different blocks within the flash memory, prior to downloading the data into the flash memory.

12. The apparatus of claim 10, wherein the initialize unit is to reclaim space, prior to downloading the data into the flash memory, within flash memory that is reclaimable for storage of the data into the flash memory upon determining that the size of free space within the flash memory is less than the size of the data to be downloaded into the flash memory.

13. The apparatus of claim 10, wherein the write unit is to store the data received from the download into a number of buffers prior to storing the data into the flash memory.

14. A system comprising:
a server coupled to a network; and
a cellular telephone wirelessly coupled to the network, wherein the cellular telephone comprises:
a flash memory partitioned into blocks;
a random access memory coupled to the flash memory;
a processor coupled to the flash memory and the random access memory, the processor to execute a number of instructions, which when executed by the processor causes the processor to:
receive a request, from the server, to download data into the flash memory;
halt the downloading of the data into the flash memory until the flash memory is initialized, wherein the initialization includes reclaiming space in the flash memory to accommodate the request, reserving the space in the flash memory to ensure the space is not used in a manner not associated with the request, and storing pointers in the random access memory to indicate the number of the blocks within the flash memory where the data is to be stored; and
store the data into the flash memory based on the pointers stored in the random access memory.

15. The system of claim 14, wherein the initialization of the flash memory comprises:
generating headers for the different locations within the flash memory where the data is to be stored; and
storing the headers at the different locations within the flash memory.

16. The system of claim 14, further comprising storing the data received from the download into a number of buffers prior to storing the data into the flash memory.

17. The system of claim 14, wherein the initialization of the flash memory comprises reclaiming space within the flash memory that is reclaimable for storage of data into the flash memory.

18. A machine-readable medium that provides instructions, which when executed by a machine, causes the machine to perform operations comprising:
receiving a request to download data into flash memory;
halting the downloading of the data into the flash memory until the flash memory is initialized, wherein the initialization includes reclaiming space in the flash memory to accommodate the request, reserving the space in the flash memory to ensure the space is not used by a device not associated with the request, and storing pointers in a second memory to indicate different locations within the flash memory where the data is to be stored; and storing the data into the flash memory based on the pointers stored in the second memory.

19. The machine-readable medium of claim 18, wherein the initialization of the flash memory comprises:
generating headers for the different locations within the flash memory where the data is to be stored; and
storing the headers at the different locations within the flash memory.

20. The machine-readable medium of claim 18, further comprising storing the data received from the download into a number of buffers prior to storing the data into the flash memory.

21. The machine-readable medium of claim 18, wherein the initialization of the flash memory comprises reclaiming space within the flash memory that is reclaimable for storage of data into the flash memory.

22. A machine-readable medium that provides instructions, which when executed by a machine, causes the machine to perform operations comprising:
receiving a request from an external device to store data into a flash memory of a device, wherein the request includes the size of the data;
in response to receiving the request, initializing the flash memory of the device prior to receiving the data, wherein the initializing comprises:
determining whether the size of free space within the flash memory is greater than the size of the data;
reclaiming space in the flash memory to accommodate the request;
reserving the space in the flash memory to ensure the space is not in a manner not associated with the request,
upon determining that the size of the free space within the flash memory is not greater than the size of the data, reclaiming space within the flash memory;
generating headers for each of a number of different locations within the flash memory where the free space is located;
storing the headers into the number of different locations within the flash memory;
storing pointers, in a second memory, to the number of different locations within the flash memory to indicate where the free space is located within the flash memory;
transmitting a signal to the external device to transmit the data after the initialization of the flash memory is completed;
receiving the data into a number of buffers within the device; and
storing the data within the number of buffers into the number of different locations within the flash memory where the free space is located.

23. The machine-readable medium of claim 22, wherein the second memory is a random access memory.

24. The machine-readable medium of claim 22, wherein the device is a cellular telephone and the external device is a server coupled to a network and wherein the data is transmitted to the cellular telephone through a wireless transmission link.

25. The machine-readable medium of claim 22, further comprising disabling interrupts within the device when portions of the data are being written into the number of different locations in the flash memory.

26. The machine-readable medium of claim 25, further comprising:
 determining whether interrupts are pending in the device periodically during the time the data is being written into the number of different locations in the flash memory; and
 periodically halting the writing of the data into the number of different locations in the flash memory and servicing the interrupts that are pending in the device upon determining that interrupts are pending.

* * * * *

UNITED STATES PATENT AND TRADEMARK OFFICE
CERTIFICATE OF CORRECTION

| | | |
|---|---|---|
| PATENT NO. | : 7,155,560 B2 | Page 1 of 1 |
| APPLICATION NO. | : 09/892816 | |
| DATED | : December 26, 2006 | |
| INVENTOR(S) | : McGrew et al. | |

It is certified that error appears in the above-identified patent and that said Letters Patent is hereby corrected as shown below:

In column 8, at line 43, delete "110" and insert --I/O--.
In column 9, at line 9, delete "110" and insert --I/O--.

Signed and Sealed this

Sixth Day of November, 2007

JON W. DUDAS
*Director of the United States Patent and Trademark Office*